(No Model.)

J. H. BUSELL.
ROTARY CUTTER.

No. 270,633. Patented Jan. 16, 1883.

Witnesses:
Walter E. Lombard.
E. A. Hemmenway.

Inventor:
James H. Busell,
by N. C. Lombard
Attorney.

UNITED STATES PATENT OFFICE.

JAMES H. BUSELL, OF BOSTON, MASSACHUSETTS.

ROTARY CUTTER.

SPECIFICATION forming part of Letters Patent No. 270,633, dated January 16, 1883.

Application filed November 20, 1882. (No model.)

*To all whom it may concern:*

Be it known that I, JAMES H. BUSELL, of Boston, in the county of Suffolk and State of Massachusetts, have invented a new and useful Improvement in Rotary Cutters, of which the following, taken in connection with the accompanying drawings, is a specification.

My invention relates to the construction of molded rotary cutters, and particularly to that class of such cutters as are sharpened by grinding the front radial faces of the blades of the cutters, and has for its object a material reduction in the area of surface to be ground upon each blade; and it consists, first, in a rotary cutter having its periphery molded or curved longitudinally, and provided with a series of blades adapted to be sharpened by grinding their front radial or nearly radial faces, said blades having their front faces recessed or undercut in such a manner that the outer boundary of said recess or under-cut shall conform in general curvature substantially to the longitudinal curve of the periphery of the cutter, as will be described.

It further consists of a cutter composed of a series of plates clamped upon a central core or mandrel, and molded or curved longitudinally, and provided with a series of blades the front faces of which are undercut or cut away to such distances from the roots of said blades that the radial depth of blade to be ground in order to sharpen the blade shall be about equal on all of the sections, regardless of the diameters of the different sections.

Figure 2:
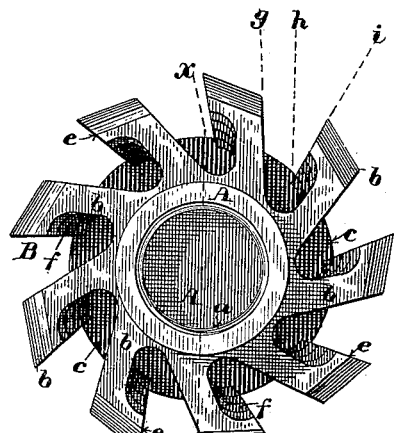
Figure 1:
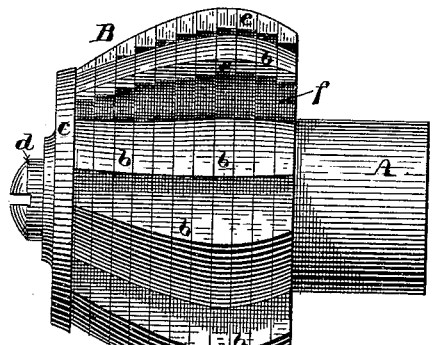

Figure 1 of the drawings is a side elevation of a rotary cutter embodying my invention. Fig. 2 is an end elevation of the same, and Fig. 3 is a longitudinal section on line *x x* on Fig. 2.

A is the central core or hub, having formed in its large end a threaded socket, *a*, by means of which it may be attached to the operating-shaft of a heel-trimming or other machine.

Figure 3:
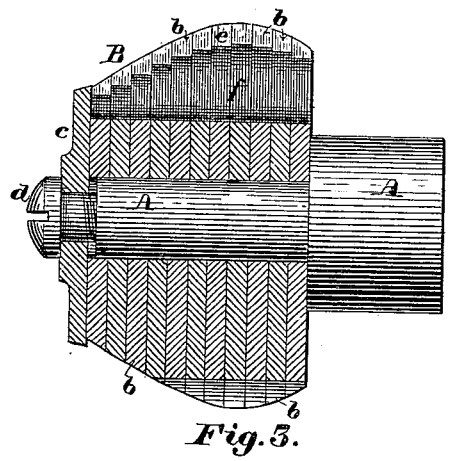

B is the cutter, composed of a series of sections, *b b*, fitted upon the core A, and clamped thereto by means of the rand-guide or collar *c* and the screw *d*, as shown in Figs. 1 and 3. The cutter B is provided, when complete, with a series of cutting-blades extending from a common hub or center in positions slightly inclined to radial lines, and having their outer edges curved longitudinally, as shown, to enable said cutter to cut a molded form upon a heel-edge or other object. The inner portion of each of the cutting-blades is reduced in thickness, or cut back from the front radial or nearly radial face of said blade, the radial extent of said cut-away varying according to the varying diameter of the molded periphery of the cutter; or, in other words, said cut-away extends outward from the root of the blade to a point about equidistant from the periphery of each section of said cutter, as shown in Fig. 3, so that there is just about the same surface to be ground upon the front of each section of each blade, whatever may be the diameter of said different sections. The surface to be ground to sharpen a blade is shown at *e*, and the cut-away or recessing of the blades is distinctly shown at *f*.

In manufacturing my improved cutter, I first take the necessary number of circular disks of steel, bore central holes therein to fit the core A, place them upon said core, or any suitable mandrel, and clamp them firmly thereto, and then turn the periphery to the desired longitudinal curve; then, by means of suitable milling-cutters, cut grooves through the several disks parallel to the axis of the hub, as indicated by the dotted lines *g h*, and then by another series of cuts remove the stock between the dotted lines *h* and *i*, as shown in Fig. 2. I then remove the sections from the core or mandrel, and take one or more of said sections of a given size—say the smallest or largest—and by milling or filing complete the cutting away of the surplus stock not removed by the previous cuts. When all of the disks of a given size have been completed I take another size and complete them in the same way, and so on till all of the sizes are completed, care being taken to proportion the last series of cuts to the diameters of the several sections, so that the faces *e* shall have about the same radial depth upon all of the sections.

I am aware that cutters have been made having a series of cutting-blades the inner portions of the front faces of which were cut away; or said blades had their inner portions reduced in thickness for the purpose of reducing the area of surface to be ground to sharpen the cutter; but in all cases, so far as my knowledge of the matter extends, said cut-away or reduction of thickness extended from end to end of the cutter of an even width, and if applied to a molded cutter the cut-away or reduction could only be of such a width as that portion of the cutter which was the smallest in diameter would admit of, and as a consequence a much broader surface had to be ground at some points of the cutter than was desirable on account of the extra time and wear of cutters required. To obviate this objection is the object of my present invention.

What I claim as new, and desire to secure by Letters Patent of the United States, is—

1. A rotary cutter having its periphery molded or curved longitudinally, and provided with a series of cutting-blades projecting from and connected homogeneously at their inner edges with a common central hub, and having the inner portions of their front radial or nearly radial faces reduced in thickness to a radial width varying according to the longitudinal curvature of the periphery of the cutter, substantially as and for the purpose described.

2. A molded rotary cutter composed of a series of sections or disks clamped upon a central core or mandrel, and provided with a series of radial or nearly radial cutting-blades the inner portions of the front faces of which are cut away or reduced in thickness to a varying radial width corresponding to the varying diameters of the several sections, or having the width of the face to be ground, in sharpening each blade, about equal upon all the sections, substantially as described.

In testimony whereof I have signed my name to this specification, in the presence of two subscribing witnesses, on this 18th day of November, A. D. 1882.

JAMES H. BUSELL.

Witnesses:
E. A. HEMMENWAY,
WALTER E. LOMBARD.